US009942153B2

United States Patent
Sane et al.

(10) Patent No.: US 9,942,153 B2
(45) Date of Patent: Apr. 10, 2018

(54) MULTIPLE PERSISTANT LOAD BALANCER SYSTEM

(71) Applicant: Dell Products L.P., Round Rock, TX (US)

(72) Inventors: Sanjay Sane, Fremont, CA (US); Krishnamurthy Subramanian, Saratoga, CA (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 14/826,991

(22) Filed: Aug. 14, 2015

(65) Prior Publication Data

US 2017/0048146 A1 Feb. 16, 2017

(51) Int. Cl.
*H04L 12/803* (2013.01)
*H04L 12/707* (2013.01)
*H04L 12/721* (2013.01)

(52) U.S. Cl.
CPC ............ *H04L 47/125* (2013.01); *H04L 45/24* (2013.01); *H04L 45/38* (2013.01)

(58) Field of Classification Search
CPC ........ H04L 45/24; H04L 45/38; H04L 47/125
See application file for complete search history.

(56) References Cited

U.S. PATENT DOCUMENTS

| | | | | |
|---|---|---|---|---|
| 2009/0303880 | A1* | 12/2009 | Maltz | H04L 45/02 370/235 |
| 2011/0314119 | A1* | 12/2011 | Kakadia | H04L 29/12066 709/213 |
| 2014/0310418 | A1* | 10/2014 | Sorenson, III | H04L 67/1002 709/226 |

* cited by examiner

*Primary Examiner* — Jamal Javaid
(74) *Attorney, Agent, or Firm* — Haynes and Boone, LLP

(57) ABSTRACT

A multiple persistent load balancer system includes a routing sub-network having a plurality of routing sub-network nodes that are coupled to a plurality of load balancer devices. A controller provides a common routing algorithm and a destination distribution list to each of the routing sub-network nodes and the load balancer devices. A first persistent load balancer device receives a first data flow from at least one of the routing sub-network nodes, and uses the common routing algorithm and the destination distribution list to determine whether the first data flow should be redirected to a second persistent load balancer device. If not, the first persistent load balancer device processes the first data flow to retrieve a resource from a server. If so, the first persistent load balancer device forwards the first data flow through at least one of the sub-network nodes to the second persistent load balancer device.

17 Claims, 11 Drawing Sheets

MULTIPLE PERSISTANT LOAD BALANCER SYSTEM

BACKGROUND

The present disclosure relates generally to information handling systems, and more particularly to providing multiple persistent load balancer information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, front end servers, act as load balancers to distribute workloads across multiple computing resources such as, for example, back end servers. For example, front end servers may receive resource requests from client systems and attempt to optimize back end server use, maximize throughput, minimize response times, avoid overload of any particular back end server, and/or provide other load balancing benefits known in the art. In many situations, multiple requests from a client system during a user session should be delivered to the same front end server when that front end server is operating as a persistent load balancer such that it is "stateful" and saves state information about the user session across the multiple requests. Such requests are typically routed by a routing sub-network using a routing strategy (e.g., Equal Cost Multi-Path (ECMP)) employed by routers and/or switches in the routing sub-network that will route those requests to the correct front end server. For example, ECMP routing sub-networks may employ five tuple hashing to route requests to particular front end servers. However, when the routing sub-network changes (e.g., via a change associated with a link, switch, switch configuration, hash parameter, etc.), the routing strategy may send those requests to an incorrect front end server (i.e., a front end server that does not include the state information for the user session associated with that request). In such situations, conventional systems (e.g., the conventional ECMP routing sub-networks that employ five tuple hashing) require that the connection/user session be reset and the client system reconnect to a new front end server.

One solution to this problem is to provide only a single persistent/stateful front end server in the system. However, such solutions are not feasible in any large scale system. Another solution requires each of the plurality of front end servers acting as persistent load balancers to synchronize state information about user sessions with each other. However, such solutions push the burden of storing state information for every user session to each of the front end servers, introduce latencies, and present barriers to scaling the system up. Another solution pushes the burden of tracking user sessions to the switches in the routing sub-network, introduce similar latencies and barriers to scaling the system up. Finally, another solution requires client systems to supply state information with each request to relieve the front end-servers from acting as persistent load balancers.

Accordingly, it would be desirable to provide an improved multiple persistent load balancer system

SUMMARY

According to one embodiment, an information handling system (IHS) includes a communication system; a processing system that is coupled to the communication system; a memory system that is coupled to the processing system and that include instruction that, when executed by the processing system, cause the processing system to provide a data flow processing engine that is configured to: receive a routing algorithm and a destination distribution list from a controller; receive a first data flow through the communication system in response to at least one routing sub-network node processing the first data flow using the routing algorithm; use the routing algorithm and the destination distribution list to determine that the first data flow should be processed and, in response, process the first data flow to retrieve at least one resource from at least one server device; receive a second data flow through the communication system in response to at least one routing sub-network node processing the second data flow using the routing algorithm; and use the routing algorithm and the destination distribution list to determine that the second data flow should be redirected to a persistent load balancer device and, in response, forward the second data flow through the communicating system to the persistent load balancer device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
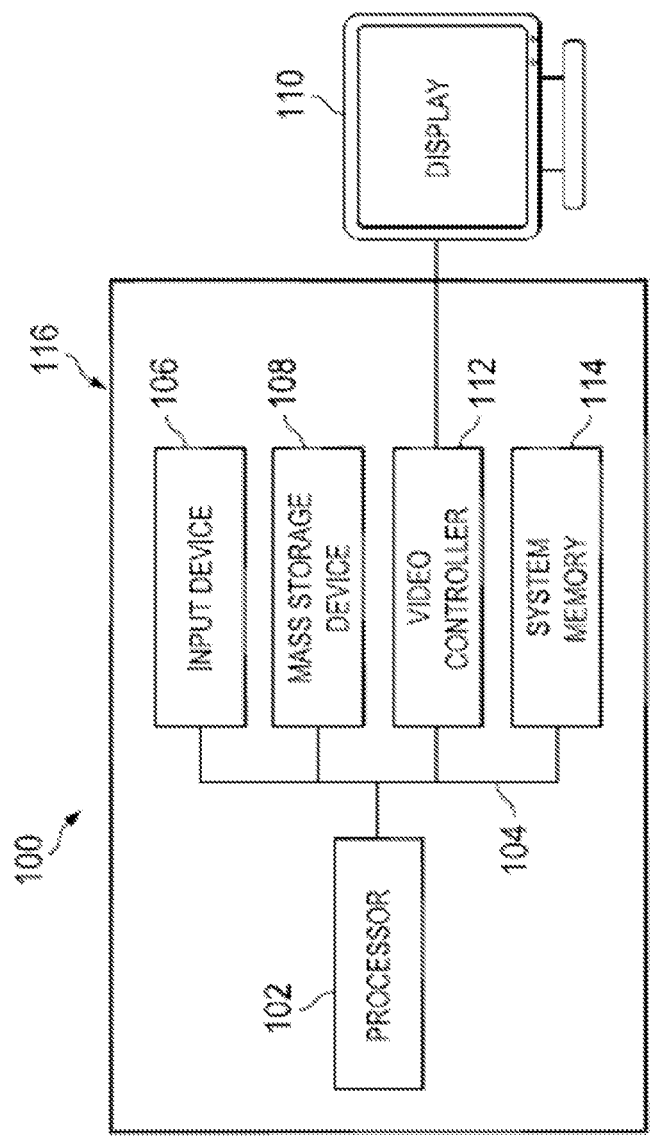
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
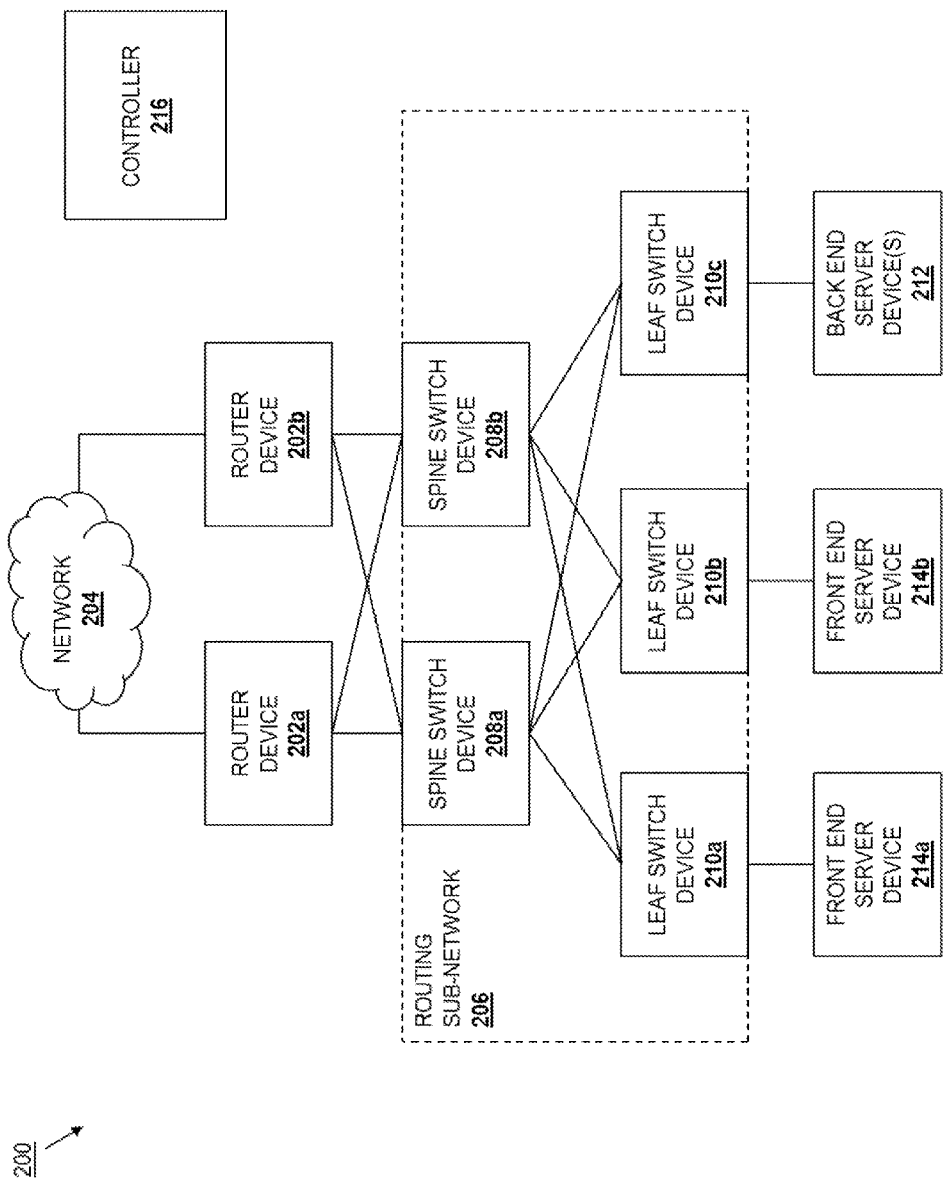
FIG. 2A is a schematic view illustrating an embodiment of a multiple persistent load balancer system.

Referring now to FIG. 2A, an embodiment of a multiple persistent load balancer system 200 is illustrated. In the illustrated embodiment, the multiple persistent load balancer system 200 includes a plurality of router devices 202a and 202b that are coupled to a network 204 such as, for example, a Local Area Network (LAN), the Internet, and/or a variety of other networks known in the art. Either or both of the router devices 202a may be the IHS 100 discussed above with reference to FIG. 1 and/or may include some or all of the components of the IHS 100. While only two router devices 202a and 202b are illustrated, any number of router devices are envisioned as falling within the scope of the present disclosure. The router devices 202a and 202b are coupled to a routing sub-network 206 that includes a plurality of routing sub-network nodes. In the embodiments illustrated and discussed below, the routing sub-network 206 is described as a layer 3 (L3) Equal Cost Multi-Pat (ECMP) cloud having routing sub-network nodes that include spine switch devices 208a and 208b (which each are directly coupled to each of the router devices 202a and 202b) and leaf switch devices 210a, 210b, and 210c (which each are directly coupled to each of the spine switch devices 208a and 208b) that each may be the IHS 100 discussed above with reference to FIG. 1 and/or may include some or all of the components of the IHS 100, and that each operate to route packets using ECMP routing algorithms and/or strategies. However, the routing sub-network 206 may be provided using a variety of different devices in a variety of different configurations and using a variety of different routing algorithms and/or strategies while remaining within the scope of the present disclosure. One or more back end server device(s) 212 are coupled to the routing sub-network 206 (e.g., via the coupling of the back end server device(s) 212 to the leaf switch device 210c in the illustrated embodiment). The back end server device(s) 212 may each be the IHS 100 discussed above with reference to FIG. 1 and/or may include some or all of the components of the IHS 100, and as discussed below may operate as resource server(s) (e.g., web servers) that provide resources to client systems.

A plurality of persistent load balancer devices are coupled to the routing sub-network 206. In the illustrated embodiment, the plurality of persistent load balancer devices are provided by front end server devices 214a and 214b that are coupled to the routing sub-network 206 via a coupling between the front end server device 214a and the leaf switch device 210a, and a coupling between the front end server device 214b and the leaf switch device 210b. The front end server devices 214a and 214b may each be the IHS 100 discussed above with reference to FIG. 1 and/or may include some or all of the components of the IHS 100. As discussed below, the front end server devices 214a and 214b may operate as persistent load balancer devices that operate to distribute workloads across the back end server(s) 212 by receiving resource requests from client systems and attempt to retrieve responses to those requests while optimizing back end server use, maximize throughput, minimize response times, avoid overload of any particular back end server, and/or provide other load balancing benefits known in the art. As such, the front end server devices 214a and 214b may receive requests from client systems and satisfy those requests using the back end server device(s) 216 based on load, processing power, and/or other factors known in the art.

While the persistent load balancer devices are illustrated and described as front end server devices, other middleboxes (e.g., firewalls), edge boxes, and/or other load balancer devices known in the art will fall within the scope of the present disclosure. As discussed above, the front end server devices 214a and 214b may operate as persistent load balancer devices such that they are "stateful" and save state information about a data flow or user session across multiple requests. As such, the front end server devices 214a and 214b may perform functions including user session creation, authentication of user session specific behaviors, and/or other front end server device/persistent load balancer device functionality known in the art. In the embodiments discussed below, the front end server devices 214a and 214b are front end server devices for the same virtual Internet protocol (vIP) address and are in an "active-active" mode (i.e., both acting as persistent load balancer devices) such that they load balance that vIP address at the same time. The back end server device(s) 212 are back end server devices for that vIP address, and the front end server devices 214a and 214b are stateful such that they will each direct a given data flow to a particular back end server device. While only two persistent load balancer devices/front end server devices 214a and 214b are illustrated in FIG. 2A, one of skill in the art in possession of the present disclosure will recognize that any number of persistent load balancer devices/front end server devices may be provided in the multiple persistent load balancer system 200 while remaining within the scope of the present disclosure, and that the teachings of the present disclosure provide particular benefits in scaling up multiple persistent load balancer systems such that more persistent load balancer devices may be used without the issues discussed above that occur with conventional persistent load balancer systems.

Figure 2B:
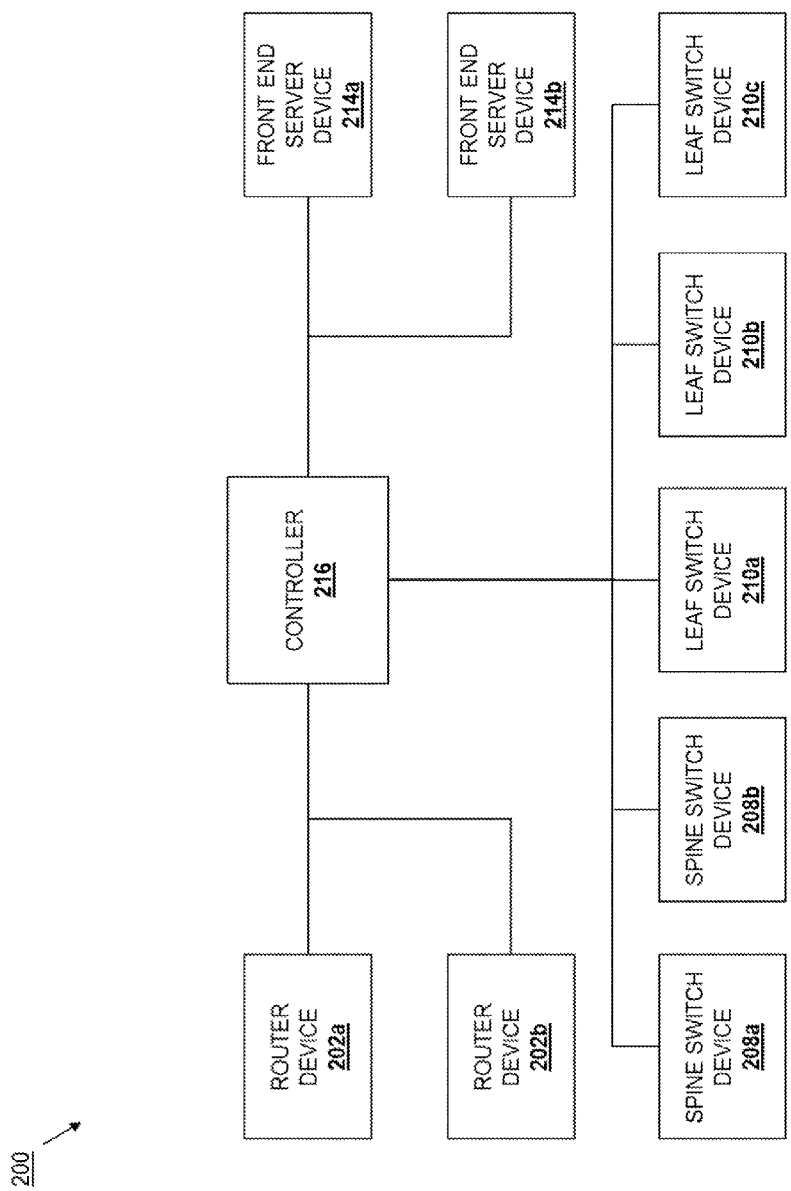
FIG. 2B is a schematic view illustrating an embodiment of device connections in the multiple persistent load balancer system of FIG. 2A.

The multiple persistent load balancer system 200 also includes a controller 216. The controller 216 may be the IHS 100 discussed above with reference to FIG. 1 and/or may include some or all of the components of the IHS 100. In the embodiments discussed below, the controller 216 is described as a Software Defined Networking (SDN) controller that performs the distribution of configurations and/or routing parameters, programmatic overrides, and/or other SDN functionality known in the art. In some embodiments, the controller 216 may provide a Border Gateway Protocol Route Reflector (BGP-RR). However, a variety of other controllers operating according to a variety of other protocols are envisioned as falling within the scope of the present disclosure as well. As illustrated in FIG. 2B, the controller 216 is coupled to each of the router devices 202a and 202b, the spine switch devices 208a and 208b, the leaf switch devices 210a, 210b, and 210c, and the front end server devices 214a and 214b. While a specific multiple persistent load balancer system 200 has been described, one of skill in the art will recognize that the teachings of the present disclosure will be beneficial to any of a variety of persistent load balancer systems including different devices and having different configurations, and thus the application of those teachings to such systems will fall within the scope of the present disclosure.

Figure 3:
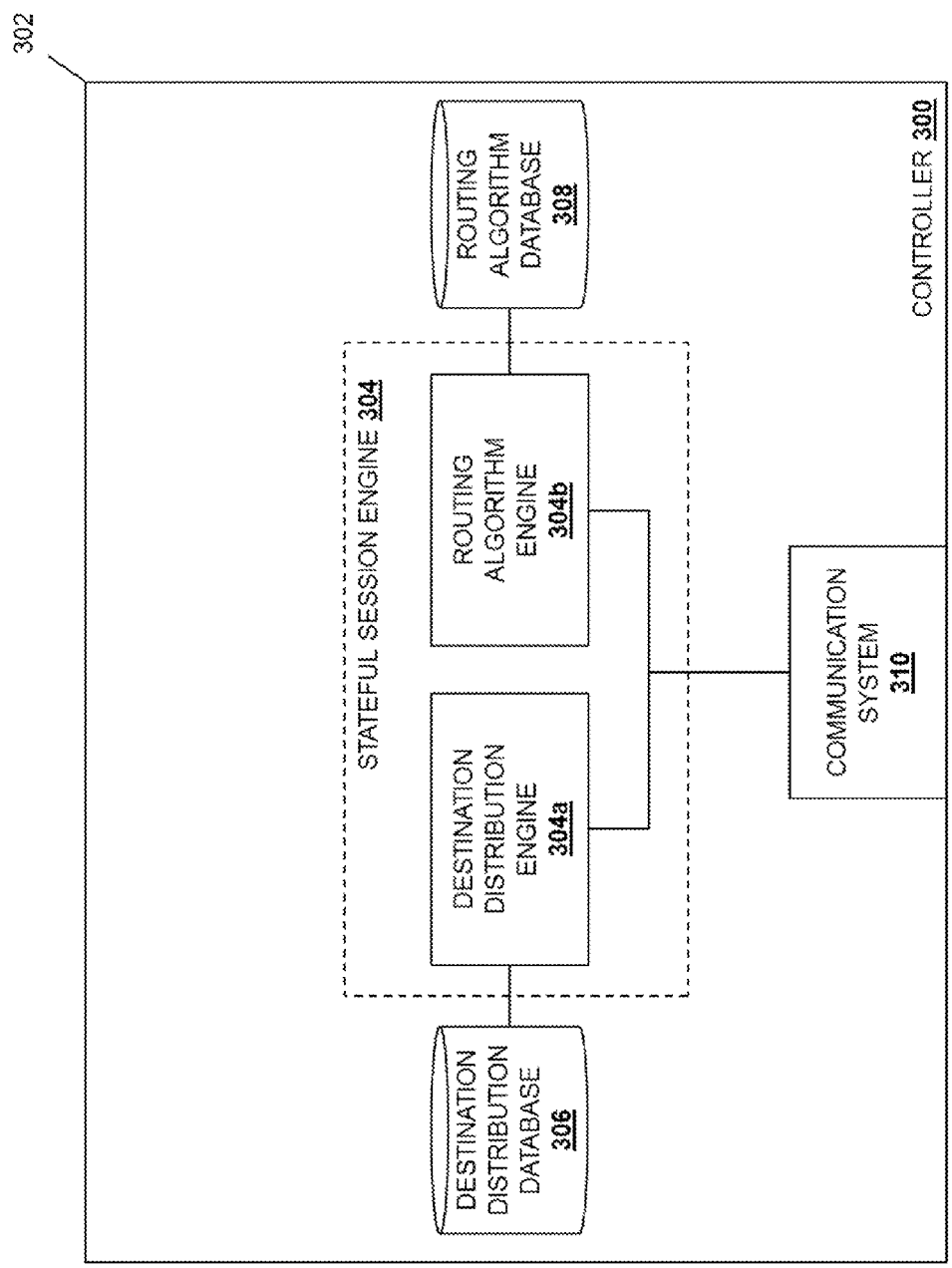
FIG. 3 is a schematic view illustrating an embodiment of a controller in the multiple persistent load balancer system of FIGS. 2A and 2B.

Referring now to FIG. 3, an embodiment of a controller 300 is illustrated. In an embodiment, the controller 300 may be the controller 216 discussed above with reference to FIGS. 2A and 2B. As such, the controller 300 may be the IHS 100 discussed above with reference to FIG. 1 and/or may include some or all of the components of the IHS 100. In the illustrated embodiment, the controller 300 includes a chassis 302 that houses the components of the controller 300. However, in some embodiments, the components of the controller 300 may be distributed across multiple chassis while remaining within the scope of the present disclosure. The chassis 302 houses a processing system (not illustrated, but which may include the processor 102 discussed above with reference to FIG. 1) and a memory system (not illustrated, but which may include the system memory 114 discussed above with reference to FIG. 1) that includes instruction that, when executed by the processing system, cause the processing system to provide a stateful session engine 304 that is configured to perform the functions of the stateful session engines and controllers discussed below. In the illustrated embodiment, the stateful session engine 304 is provided by a destination distribution engine 304a and a routing algorithm engine 304b. However, the destination distribution engine 304a and the routing algorithm engine 304b may be combined into a single engine or separate into further engines while remaining within the scope of the present disclosure.

The chassis 302 also houses a storage system (not illustrated, but which may include the storage device 108 discussed above with reference to FIG. 1) that includes a destination distribution database 306 and a routing algorithm database 308. The destination distribution engine 304a is coupled to the destination distribution database 306 (e.g., via a coupling between the processing system and the storage system), and the destination distribution database 306 may store one or more destination distribution lists. In the embodiments discussed below, the destination distribution list(s) include sorted, ordered distribution list(s) that associate persistent load balancer devices with the virtual Internet Protocol (vIP) addresses handled by those persistent load balancer devices. For example, a destination distribution list may associated the front end server device 214a and the front end server device 214b with a first vIP address (e.g., vIP-1→{front end server device 214a, front end server device 214b}) when both of the front end server devices 214a and 214b are persistent load balancer devices for the first vIP address and can load balance for that first vIP address at the same time. Similarly, destination distribution list(s) in the destination distribution database 306 may associate other front end server devices with the vIP's address handled by those other front end server devices such that each front end server device in the multiple persistent load balancer system 200 is associated with a vIP address in the destination distribution database 306 (e.g., vIP-2→{other front end server devices}). As such, the controller 300 may maintain destination distribution list(s) on a per-vIP basis. While a specific embodiment of destination distribution lists has been described, one of skill in the art in possession of the present disclosure will recognize that the destination distribution lists utilized herein may include other information that will provide for the functionality discussed below while remaining within the scope of the present disclosure.

The routing algorithm engine 304b is coupled to the routing algorithm database 308 (e.g., via a coupling between the processing system and the storage system), and the routing algorithm database 308 may store one or more routing algorithms. In the embodiments discussed below, the routing algorithms may include an ECMP routing algorithm. For example, the routing algorithm database 308 may store ECMP hashing parameters for the ECMP routing algorithm that allow for the performance of ECMP hashing operations. However, while a specific embodiment of a routing algorithm is described herein, one of skill in the art in possession of the present disclosure will recognize that the routing algorithm may be represented by a variety of other routing algorithm information that may be utilized to provide for the functionality discussed below while remaining within the scope of the present disclosure. The stateful session engine 304 is coupled to a communication system 310 (e.g., though a coupling between the processing system and the communication system 310) that may include a network interface controller (NIC), a wireless communication device, and/or a variety of other communication system components that provide for the coupling of the controller 300 to devices in the multiple persistent load balancer system 200 (e.g., as illustrated in FIG. 2B). While a specific controller 300 has been illustrated and described, one of skill in the art in possession of the present disclosure will recognize that the controller 300 may include additional and/or different components in different configurations while remaining within the scope of the present disclosure.

Figure 4:
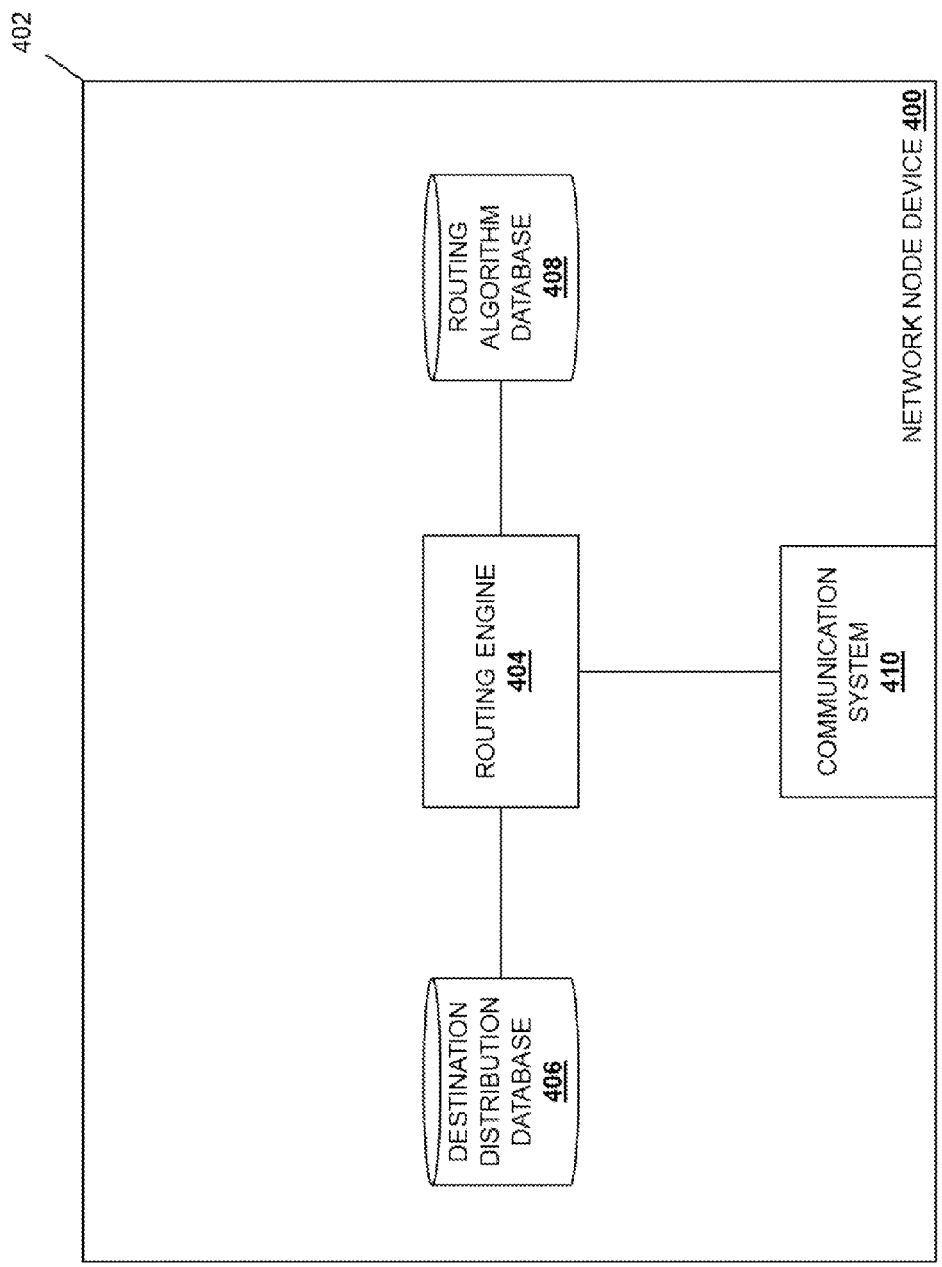
FIG. 4 is a schematic view illustrating an embodiment of a network node device in the multiple persistent load balancer system of FIGS. 2A and 2B.

Referring now to FIG. 4, an embodiment of a network node device 400 is illustrated. In an embodiment, the network node device 400 may be the router devices 202a, 202b; the spine switch devices 208a, 208b; and/or the leaf switch devices 210a, 210b, 210c, discussed above with reference to FIGS. 2A and 2B. As such, the network node device 400 may be the IHS 100 discussed above with reference to FIG. 1 and/or may include some or all of the components of the IHS 100. In the illustrated embodiment, the network node device 400 includes a chassis 402 that houses the components of the network node device 400. However, in some embodiments, the components of the network node device 400 may be distributed across multiple chassis while remaining within the scope of the present disclosure. The chassis 402 houses a processing system (not illustrated, but which may include the processor 102 discussed above with reference to FIG. 1) and a memory system (not illustrated, but which may include the system memory 114 discussed above with reference to FIG. 1) that includes instruction that, when executed by the processing system, cause the processing system to provide a routing engine 404 that is configured to perform the functions of the routing engines and network node devices discussed below.

The chassis 402 also houses a storage system (not illustrated, but which may include the storage device 108 discussed above with reference to FIG. 1) that includes a destination distribution database 406 and a routing algorithm database 408. The routing engine 404 is coupled to each of the destination distribution database 406 and the routing algorithm database 408 (e.g., via a coupling between the processing system and the storage system), with the destination distribution database 406 configured to store one or more destination distribution lists (discussed above with reference to FIG. 3), and with the routing algorithm database 408 configured to store one or more routing algorithms and/or routing algorithm parameters (discussed above with reference to FIG. 3). The routing engine 404 is coupled to a communication system 410 (e.g., though a coupling between the processing system and the communication system 410) that may include a network interface controller (NIC), a wireless communication device, and/or a variety of other communication systems known in the art. While a specific network node device 400 has been illustrated and described, one of skill in the art in possession of the present disclosure will recognize that the network node device 400 may include additional and/or different components in different configurations while remaining within the scope of the present disclosure. For example, the network node device 500 may be provided virtual routers and/or switches rather than the physical routers and switches described above.

Figure 5:
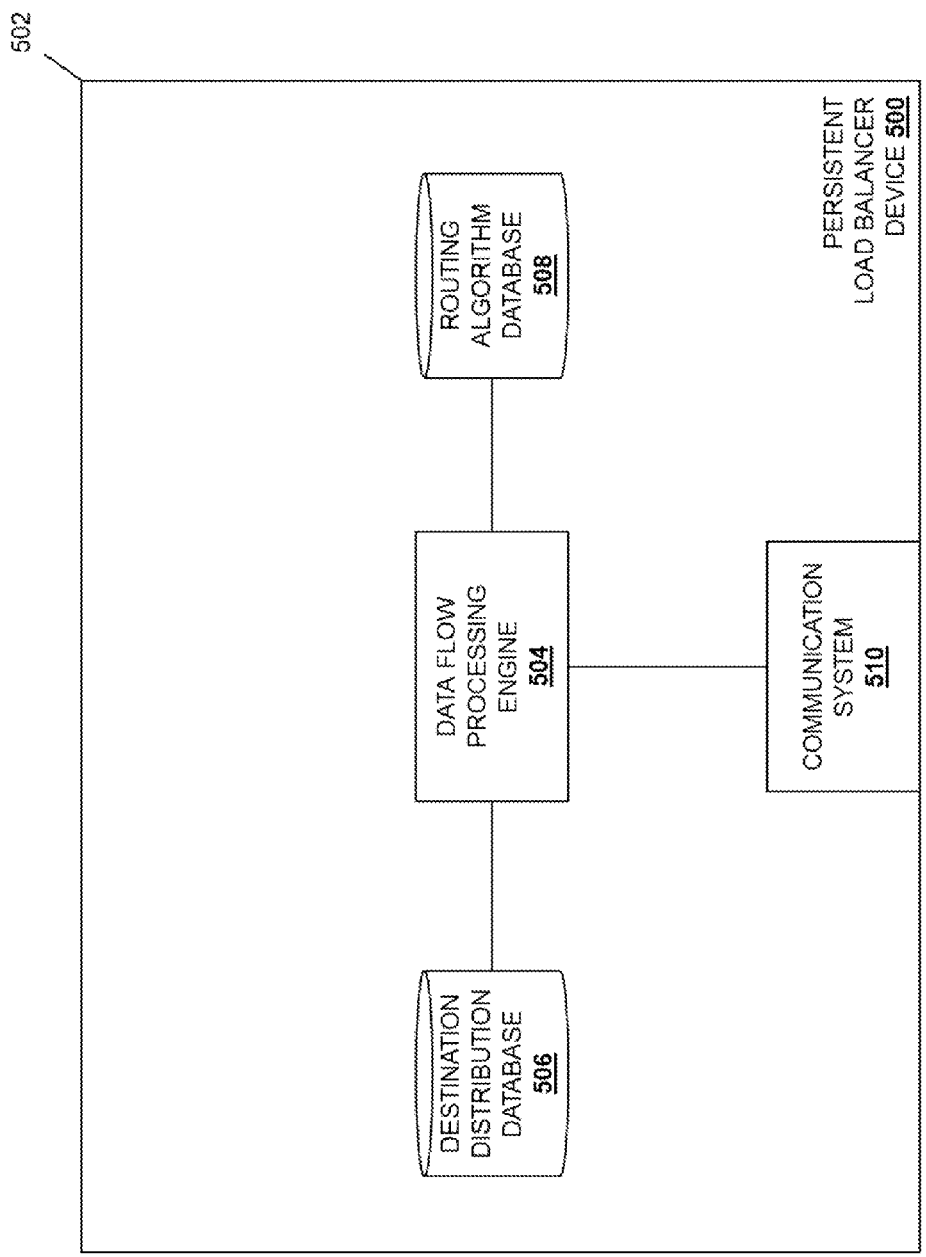
FIG. 5 is a schematic view illustrating an embodiment of a front end server device in the multiple persistent load balancer system of FIGS. 2A and 2B.

Referring now to FIG. 5, an embodiment of a persistent load balancer device 500 is illustrated. In an embodiment, the persistent load balancer device 500 may be the front end server devices 214a and/or 214b discussed above with reference to FIGS. 2A and 2B. As such, the persistent load balancer device 500 may be the IHS 100 discussed above with reference to FIG. 1 and/or may include some or all of the components of the IHS 100. In the illustrated embodiment, the persistent load balancer device 500 includes a chassis 502 that houses the components of the persistent load balancer device 500. However, in some embodiments, the components of the persistent load balancer device 500 may be distributed across multiple chassis while remaining within the scope of the present disclosure. The chassis 502 houses a processing system (not illustrated, but which may include the processor 102 discussed above with reference to FIG. 1) and a memory system (not illustrated, but which may include the system memory 114 discussed above with reference to FIG. 1) that includes instruction that, when executed by the processing system, cause the processing system to provide a data flow processing engine 504 that is configured to perform the functions of the data flow processing engines and persistent load balancer devices discussed below.

The chassis 502 also houses a storage system (not illustrated, but which may include the storage device 108 discussed above with reference to FIG. 1) that includes a destination distribution database 506 and a routing algorithm database 508. The data flow processing engine 504 is coupled to each of the destination distribution database 506 and the routing algorithm database 508 (e.g., via a coupling between the processing system and the storage system), with the destination distribution database 506 configured to store one or more destination distribution lists (discussed above with reference to FIG. 3), and with the routing algorithm database 508 configured to store one or more routing algorithms and/or routing algorithm parameters (discussed above with reference to FIG. 3). The data flow processing engine 504 is coupled to a communication system 510 (e.g., though a coupling between the processing system and the communication system 510) that may include a network interface controller (NIC), a wireless communication device, and/or a variety of other communication systems known in the art. While a specific persistent load balancer device 500 has been illustrated and described, one of skill in the art in possession of the present disclosure will recognize that the persistent load balancer device 500 may include additional and/or different components in different configurations while remaining within the scope of the present disclosure. For example, the persistent load balancer device 500 may be provided by virtual front end server devices rather than the physical front end server devices described above.

Figure 6:
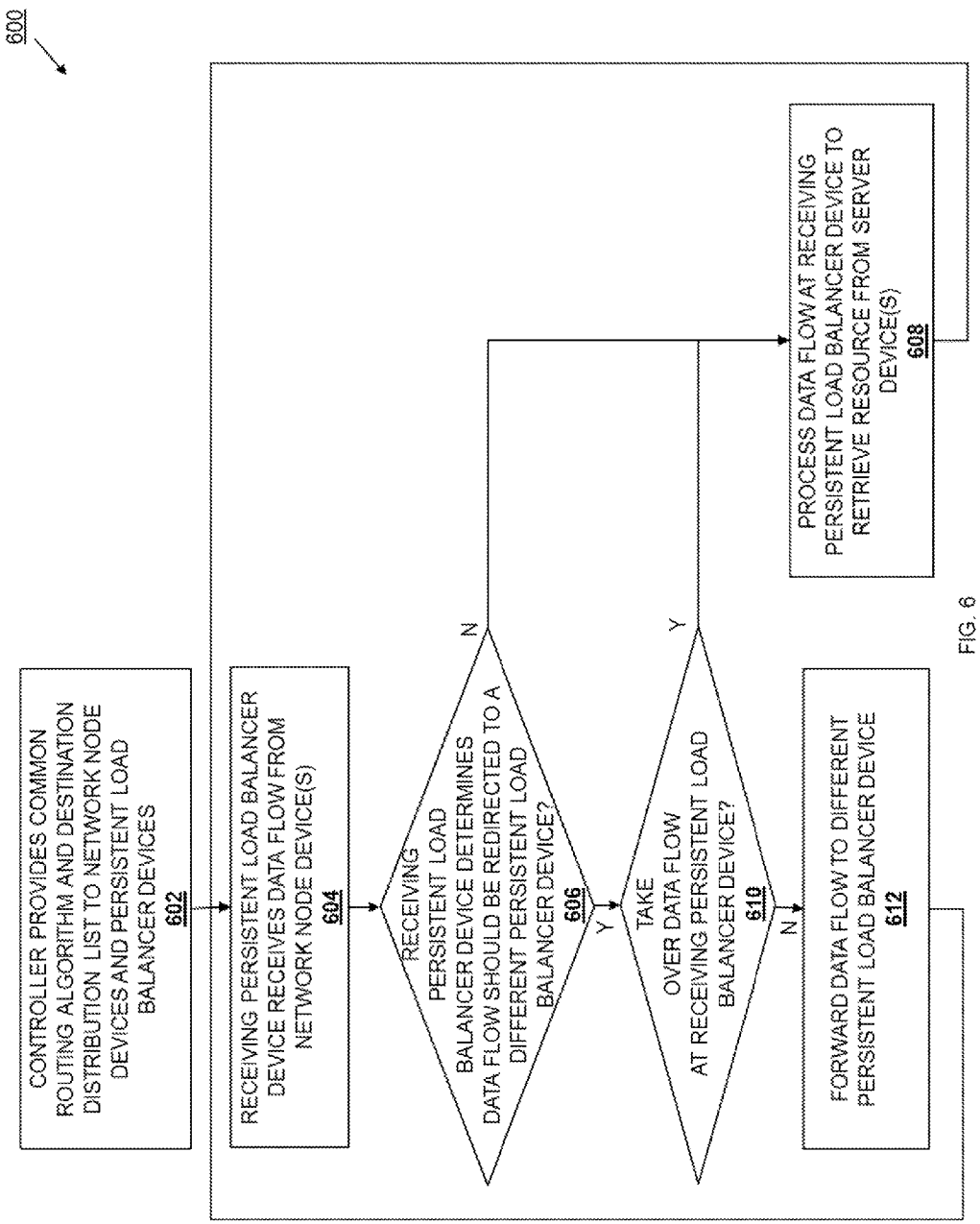
FIG. 6 is a flow chart illustrating an embodiment of a method for providing multiple persistent load balancers.

Referring now to FIG. 6, an embodiment of a method 600 for providing multiple persistent load balancers is illustrated. As discussed above, a variety of problems exist with the use of multiple front end server devices each acting as a persistent load balancer. For example, with reference to FIG. 2A, in a conventional system the front end server devices 214a and 214b may utilize Border Gateway Protocol/Open Shortest Path First (BGP/OSPF) adjacency with one or more default gateways such that they announce/attract data flows directed to the same vIP address (e.g., vIP-1). As the spine switch devices 208a and 208b expose that sub-network, data flows may ingress the routing sub-network 206 through either of the spine switch devices 208a and 208b, and a given data flow to vIP-1 directed to one of front end server devices 214a and 214b using ECMP hashing operations. When front end server devices 214a and 214b each act as persistent load balancer devices, they are stateful and will process particular data flows to particular back end server devices 216 (e.g., front end server device 214a may process first data flow to a first back end server 216). However, if there is a change in the routing sub-network 206 (e.g., a change in a link in the routing sub-network (e.g., a "link flap" or other link change), a change in a network node device in the routing sub-network 206 (e.g., a "node flap" or other node change), a change in a configuration of the routing sub-network 206, a change in a hashing parameter used by a network node device in the routing sub-network, and/or other routing sub-network changes known in the art), a particular data flow that was previously routed by the routing sub-network 206 to the front end server device 214a may instead be routed to the front end server device 214b. As described above, convention solutions to this problem are to reset the connection/user session for that data flow, synchronize states/sessions between the front end server devices 214a and 214b, and/or otherwise perform actions that introduce latencies, present barriers to scaling the system up, and/or otherwise provide undesirable side effects.

As discussed below, the method 600 provides a multiple persistent load balancer system that does not suffer from the deficiencies discussed above by providing a controller that distributes a routing algorithm and a destination distribution list to each of the network node devices in the routing sub-network, as well as to the front-end server devices 214a and 214b (and any other front end server devices in the system acting as persistent load balancer devices). When any of those front end server devices receives a data flow, it determines whether it should process that data flow to retrieve a resource from a back end server device, or forward that data flow to a different front end server device, by applying the routing algorithm to the data flow and comparing the result to the destination distribution list. As such, when there are changes in the routing sub-network that cause a data flow that was previously being directed to a first front end server device to be directed to a second front end server device, the second front end server device may determine that the first front end server device is the appropriate front end server device for that data flow and forward that data flow to the first front end server device such that the connection/user session for that data flow need not be reset. In particular embodiments, a multiple persistent load balancer system may be provided that utilizes an SDN controller to distribute ECMP hashing parameters and a destination distribution list to the persistent load balancer devices and network node devices in order to allow for the use of a simple ECMP based routing sub-network with multiple persistent load balancer devices while not requiring state or session synchronization between the persistent load balancer devices, which provides a highly scalable system (i.e., no restrictions on the number of persistent load balancer devices/front end server devices) that does not suffer from the problems detailed above.

Figure 7:
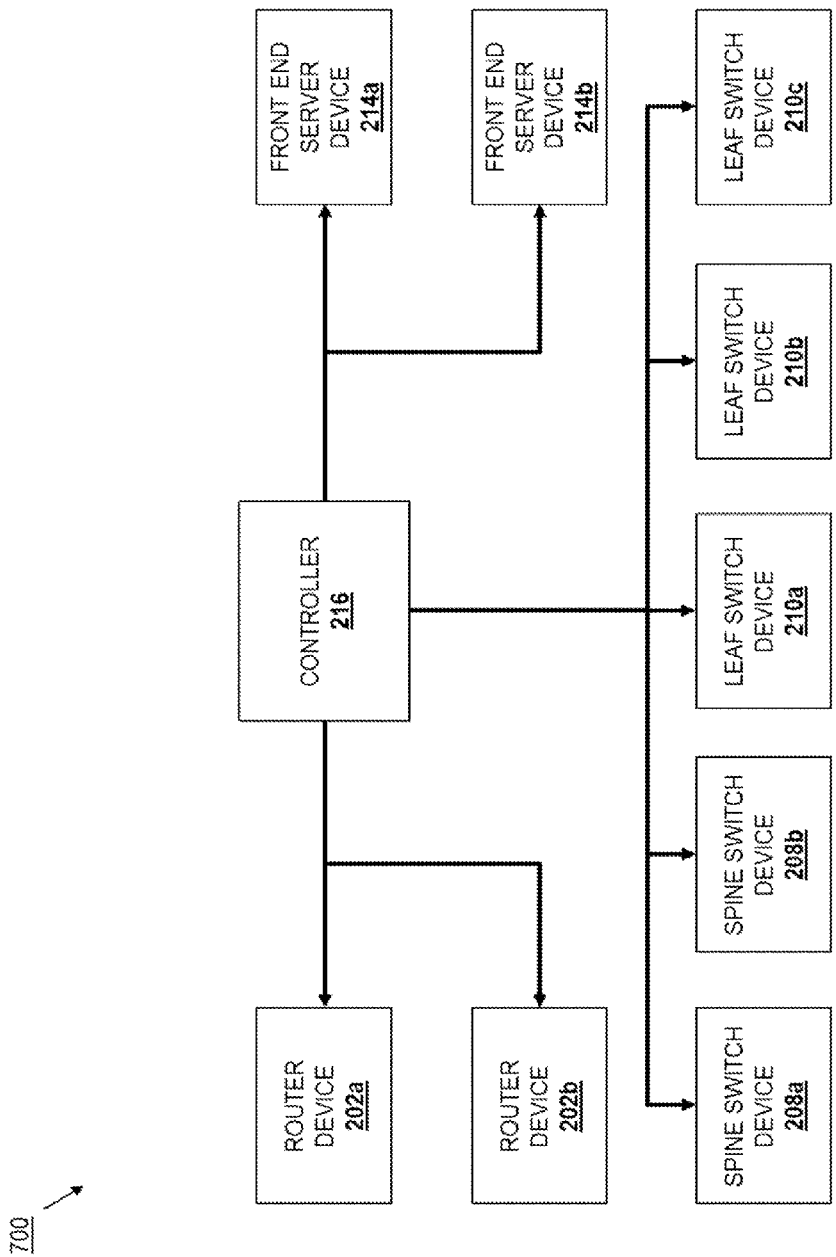
FIG. 7 is a schematic view illustrating communication between devices in the multiple persistent load balancer system of FIGS. 2A and 2B.

The method 600 begins at block 602 where a controller providers a common routing algorithm and destination distribution list to network node devices and persistent load balancer devices. With reference to FIGS. 3, 4, 5, and 7, at block 602, the routing algorithm engine 304b in the controller 300 may retrieve a routing algorithm and/or routing algorithm parameters from the routing algorithm database 308 and send that routing algorithm and/or routing algorithm parameters through the communication systems 310 to each of the router devices 202a and 202b, the spine switch devices 208a and 208b, the leaf switch devices 210a, 210b, and 210c, and the front end server devices 214a and 214b, as illustrated in FIG. 7. For example, the controller 300 may be an SDN controller that is configured to retrieve routing algorithm hashing parameters (e.g., ECMP hashing parameters such as hashing functions, seeds, and/or other hashing parameters known in the art) and send those same routing algorithm hashing parameters to each of the router devices 202a and 202b, the spine switch devices 208a and 208b, the leaf switch devices 210a, 210b, and 210c, and the front end server devices 214a and 214b. As discussed below, the distribution of the common routing algorithm and/or routing algorithm parameters in this manner may provide for consistent hashing operations in each of the network node devices to ensure that a given data flow is directed to the same front end server device (i.e., when no changes in the routing sub-network 206 have occurred). The routing engine 404 in each network node device 400 (i.e., the router devices 202a and 202b, the spine switch devices 208a and 208b, the leaf switch devices 210a, 210b, and 210c) receives that routing algorithm and/or routing algorithm parameters through the communication system 410 and stores the routing algorithm and/or routing algorithm parameters in the routing algorithm database 408, while the data flow processing engine 504 in each persistent load balancer device 500 (i.e., the front end server devices 214a and 214b) receives that routing algorithm and/or routing algorithm parameters through the communication system 510 and stores the routing algorithm and/or routing algorithm parameters in the routing algorithm database 508.

At block 602, the destination distribution engine 304a in the controller 300 may retrieve one or more destination distribution lists from the destination distribution database 306 and send the destination distribution lists(s) through the communication systems 310 to each of the router devices 202a and 202b, the spine switch devices 208a and 208b, the leaf switch devices 210a, 210b, and 210c, and the front end server devices 214a and 214b, as illustrated in FIG. 7. For example, the controller 300 may be an SDN controller that is configured to retrieve destination distribution list(s) that associate front end server devices with a common address (e.g., a vIP address handled by each of the front end server devices 214a and 214b) and send those destination distribution list(s) to each of the router devices 202a and 202b, the spine switch devices 208a and 208b, the leaf switch devices 210a, 210b, and 210c, and the front end server devices 214a and 214b. As discussed below, the distribution of the destination distribution list(s) in this manner provides the front end server devices 214a and 214b the ability to determine (with the use of the common routing algorithm) when a received data flow is actually meant for a different front end server device (e.g., due to that received data flow having been sent to the receiving front end server device because of a routing sub-network change). The routing engine 404 in each network node device 400 (i.e., the router devices 202a and 202b, the spine switch devices 208a and 208b, the leaf switch devices 210a, 210b, and 210c) receives the destination distribution list(s) through the communication system 410 and stores the destination distribution list(s) in the destination distribution database 406, while the data flow processing engine 504 in each persistent load balancer device 500 (i.e., the front end server devices 214a and 214b) receives the destination distribution list(s) through the communication system 510 and stores the destination distribution list(s) in the destination distribution database 508.

In an embodiment, the utilization of network node devices and front end server devices with open operating systems opens up the hardware of the system and its programming such that the SDN controller may distribute the destination distribution lists and routing algorithms, as well as perform programmatic overrides, to dictate the operation of that hardware to operate as desired (e.g., perform the consistent hashing discussed below). The provisioning of the common routing algorithm and the destination distribution lists to the network node devices and persistent load balancer devices is illustrated as being performed once at block 602 in the method 600. However, block 602 of the method 600 may be performed by the controller when the destination distribution list(s) changes, when the routing algorithm or routing algorithm parameters change, when a persistent load balancer device is instantiated or removed from the system, and/or in response to a variety of other events that one of skill in the art in possession of the present disclosure would recognize would benefit from redistribution of the common routing algorithm and/or the destination distribution list(s).

The method 600 then proceeds to block 604 where a receiving persistent load balancer device receives a data flow from one or more network node devices. For example, with reference to FIG. 8, a network path 800 for a data flow is illustrated that may include one or more data packets that are sent over the network 204 in response to client system sending a request for a resource provided on one of the back end server device(s) 216. That data flow may be received through the network 204 by the router device 202*a* and processed using the routing algorithm (e.g., by the routing engine 404 using an ECMP hashing operation) to direct that data flow to the spine switch device 208*a*. Similarly, that data flow may be received from by the spine switch device 208*a* and processed using the routing algorithm (e.g., by the routing engine 404 using an ECMP hashing operation) to direct that data flow to the leaf switch device 210*a*. Finally, that data flow may be received by the leaf switch device 210*a* and processed using the routing algorithm (e.g., by the routing engine 404 using an ECMP hashing operation) to direct that data flow to the front end server device 214*a* that is acting as a persistent load balancer device to load balance requests for the back end server device(s) 216. At block 604, the data flow processing engine 504 in the persistent load balancer device 500/front end server device 214*a* receives the data flow (e.g., one or more data packets) through the communication system 510. As discussed below, the network path 800 of the data flow illustrated FIG. 8 is discussed below as provided an example of a path 800 for the data flow prior to a change in the routing sub-network 206.

Figure 8:
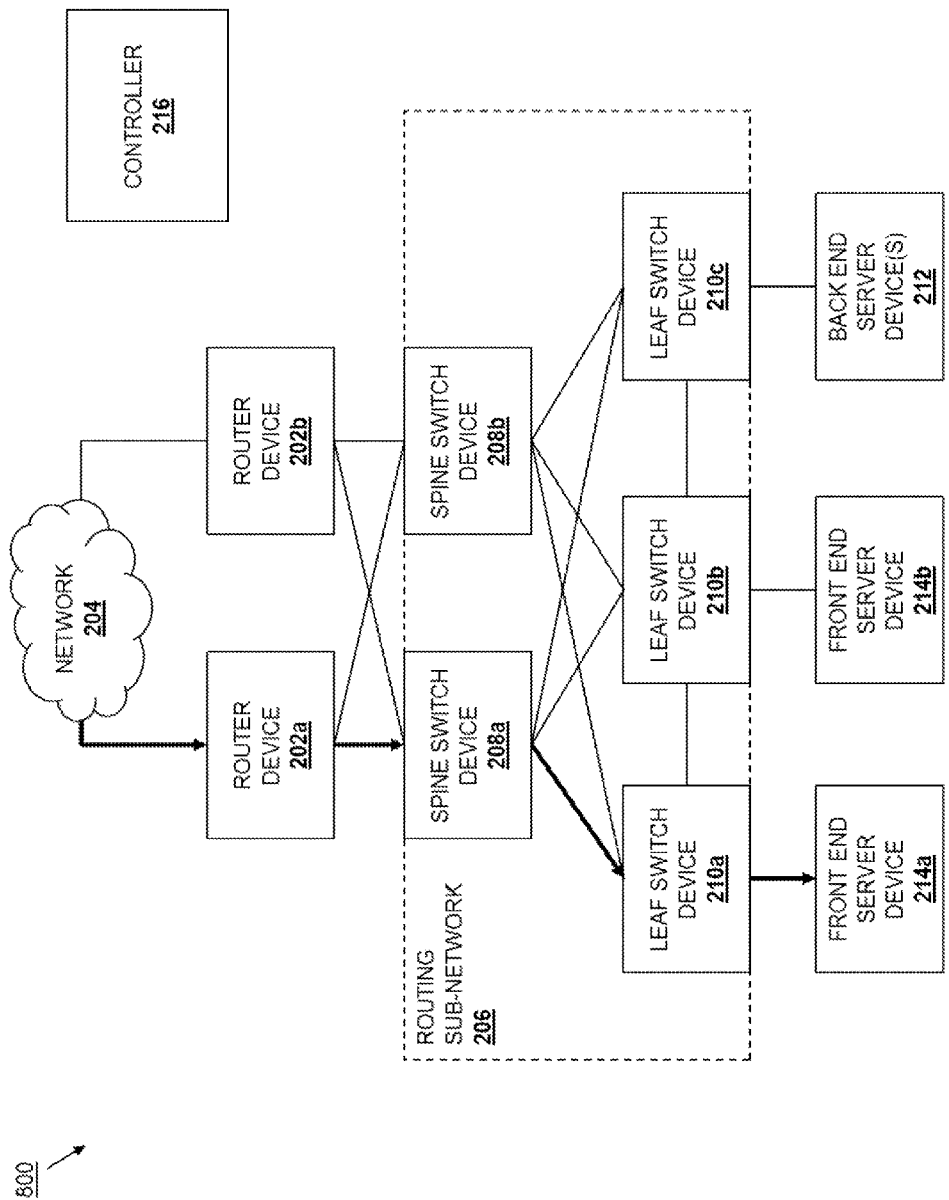
FIG. 8 is a schematic view illustrating a network path of a data flow in the multiple persistent load balancer system of FIGS. 2A and 2B.
Figure 9:
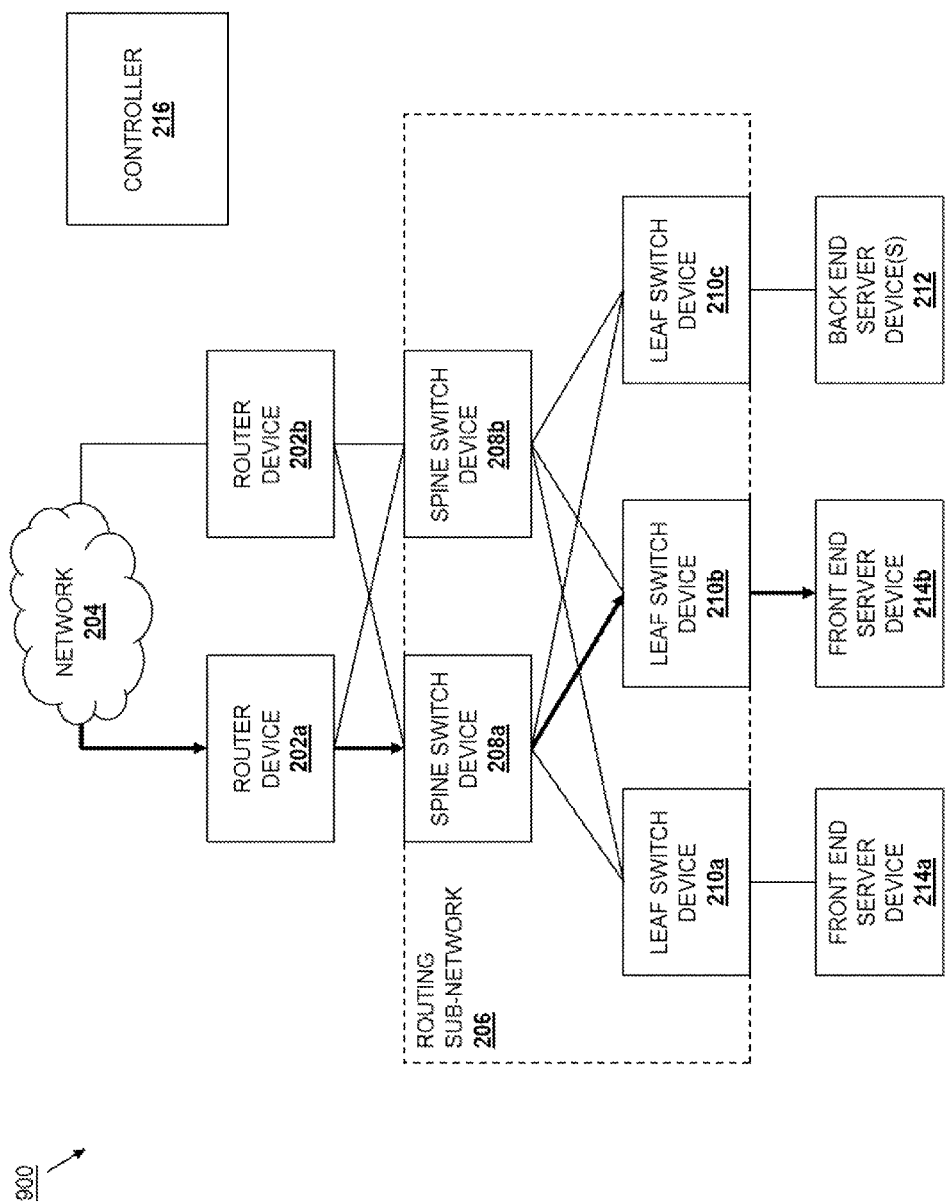
FIG. 9 is a schematic view illustrating a network path of the data flow in the multiple persistent load balancer system of FIG. 8 following a change in a routing sub-network.

In another example of block 604, with reference to FIG. 9, a network path 800 for a data flow is illustrated that may be part of the same user session as the data flow illustrated in FIG. 8, and that may include one or more data packets that are sent over the network 204 subsequent to the data packet(s) illustrated in FIG. 8 in response to client system sending a subsequent request for the resource provided on the one of the back end server device(s) 216. That data flow may be received through the network 204 by the router device 202*a* and processed using the routing algorithm (e.g., by the routing engine 404 using an ECMP hashing operation) to direct that data flow to the spine switch device 208*a*. Similarly, that data flow may be received from by the spine switch device 208*a* and processed using the routing algorithm (e.g., by the routing engine 404 using an ECMP hashing operation) to direct that data flow to the leaf switch device 210*b*. Finally, that data flow may be received by the leaf switch device 210*b* and processed using the routing algorithm (e.g., by the routing engine 404 using an ECMP hashing operation) to direct that data flow to the front end server device 214*b* that is acting as a persistent load balancer device to load balance requests for the back end server device(s) 216. At block 604, the data flow processing engine 504 in the persistent load balancer device 500/front end server device 214*b* receives the data flow (e.g., one or more data packets) through the communication system 510.

As discussed below, the network path 900 of the data flow illustrated FIG. 9 is discussed below as providing an example of the data flow subsequent to a change in the routing sub-network 206. For example, the link between the spine switch device 208*a* and the leaf switch device 210*a* may have "gone down", begun "flapping" (i.e., providing intermittent availability), and/or otherwise become available subsequent to the data flow traversing the path 800 illustrated in FIG. 8 and, as a result, the (vIP-1→{front end server device 214*a*}) path was no longer an ECMP path for the spine switch device 208*a*, resulting in the spine switch device 208*a* forwarding the data flow to the leaf switch device 210*b* and that data flow being forwarded to the front end server device 214*b* rather than the front end server 214*a* that was previously handling that data flow/user session and that includes the state information for that data flow/user session.

The method 600 then proceeds to decision block 606 where the receiving persistent load balancer device determines whether the data flow should be redirected to a different persistent load balancer device. In an embodiment, the data flow processing engine 504 uses the routing algorithm in the routing algorithm database 508 and the distribution list(s) in the destination distribution database 506 to determine whether the data flow should be redirected to a different persistent load balancer device. In an embodiment of decision block 606, the data flow processing engine 504 may perform a hashing operation on a data packet received as part of the data flow using one or more routing algorithm hashing parameters in order to produce a hashing result, and then compare that hashing result to the destination distribution list(s) to determine an associated persistent load balancer device. For example, the data flow processing engine 504 may inspect a data packet in the data flow and determine, based on 5-tuple information and hashing parameters in the routing algorithm database 508, whether that data flow was correctly routed or whether it should have been routed to a different persistent load balancer device identified by the destination distribution list(s). While a specific embodiment has been described, one of skill in the art in possession of the present disclosure will recognize that different destination distribution list and routing algorithm information may be utilized in determining whether a data flow should be redirected at decision block 606 while remaining within the scope of the present disclosure.

If, at decision block 606, it is determined that the data flow should not be redirected to a different persistent load balancer device, the method 600 proceeds to block 608 where the data flow is processed at the receiving persistent load balancer device to retrieve a resource from at least one server device. Referring to FIG. 8, the front end server device 214*a* may have received the data flow along the network path 800, determined at decision block 606 that that data flow should not be redirected and, in response, the front end server device 214*a* will process the data flow to retrieve a resource from one of the back end server device(s) 216 using conventional methods known in the art. As such, if a persistent load balancer device receives a data flow that it has been handling and for which it includes stateful user session information, that persistent load balancer device processes that data flow in a conventional manner to retrieve the resource requested by the client system from the appropriate back end server device 216. The method 600 then returns to block 604 where data flows are received and processed as described above and further below.

Figure 10:
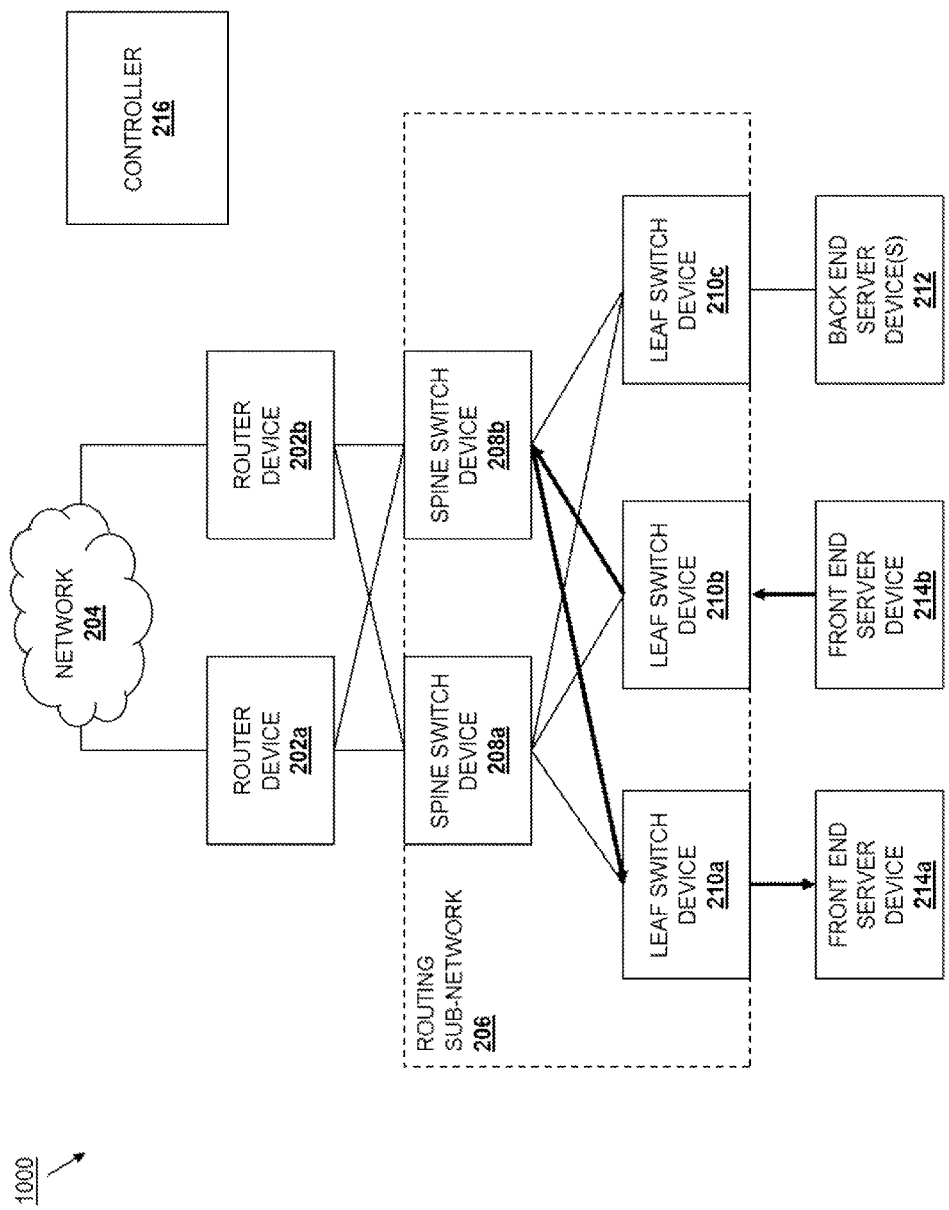
FIG. 10 is a schematic view illustrating the redirection of a request in the multiple persistent load balancer system of FIG. 9.

If, at decision block 606, it is determined that the data flow should be redirected to a different persistent load balancer device, the method 600 proceeds to decision block 610 where it is determined whether the data flow should be taken over by the receiving persistent load balancer device. The functions, actions, and operations at decision block 610 are discussed in further detail below. If at decision block 610 it is determined that the receiving persistent load balancer device should not take over the data flow, the method 600 proceeds to block 612 where the data flow is forwarded to the different persistent load balancer device. Referring to FIG. 9, the front end server device 214b may have received the data flow along the network path 900 and, at decision block 606 determined that that data flow should be redirected to the front end server 214a (e.g., because a change in the routing sub-network 206 resulted in the front end server device 214b incorrectly receiving the data flow that was previously being handled by the front end server device 214a as discussed above). In response, the front end server device 214b will forward the data flow to the front end server device 214a. Referring to FIG. 10, a network path 1000 for the data flow illustrates the redirection of the data flow by the front end server device 214b sending the data flow to the leaf switch device 210b, the leaf switch device 210b sending the data flow to the spine switch device 208b, the spine switch device 208b sending the data flow to the leaf switch deices 210a, and the leaf switch device 210a sending the data flow to the front end server device 214a. One of skill in the art will recognize that other network paths may exist to redirect the data flow to the front end server device 214a as well. In one example, the front end server device 214b may send the data flow to the front end server device 214a through a stateless tunnel such that further ECMP decisions are not made for the redirected packet(s).

In response to receiving the data flow, the front end server decide 214a may process that data flow to retrieve resources from the back end server device 212, in some cases utilizing the stateful user session information included on the front end server device 214a. As such, if a persistent load balancer device receives a data flow that is has not been handling and for which another persistent load balancer device holds stateful user session information, that persistent load balancer device redirects that data flow to the proper persistent load balancer device that had been previously handling that data flow and that holds its stateful user session information. The method 600 then returns to block 604 where data flows are received and processed as described above and further below.

Returning to decision block 610, in some embodiments, a persistent load balancer device that repeatedly receives a data flow that should have been directed to different persistent load balancer device may take over that data flow. For example, the data flow processing engine 504 in the front end server device 214b illustrated in FIG. 9 may repeatedly receive the data flow on the network path 900 that should have been directed to the front end server device 214a as the method 600 loops through blocks 604, 606, and 612. After receiving some maximum number of packets for that data flow, the data flow processing engine 504 in the front end server device 214b may determine that it should take over the data flow for the front end server device 214a. In some embodiments, the data flow processing engine 504 in the front end server device 214b may also inspect the data flow to determine its length (i.e., that it will continue for some minimum amount of time following the take over) in order to determine whether to take over the data flow. In response to determining at decision block 610 to take over the data flow, the data flow processing engine 504 may request state/user session information for the data flow from the front end server device 214a (e.g., using a side band mechanism known in the art), wait for a gap in the data flow, and then take over the data flow by processing the next data packet that is received to retrieve a response from one or more of the back end server device(s) 216. In addition, the front end server device 214b may inform the front end server device 214a and the network node devices that it has taken over the data flow.

Thus, systems and methods have been described that provide a multiple persistent load balancer system that allows for data flows to be correctly and reliably routed to any of a plurality of stateful and persistent load balancer devices by providing persistent load balancer devices that are configured to inspect any data flow received and determine whether that data flow should have been routed to a different persistent load balancer device. Such actions by the persistent load balancer devices allow for changes in the routing sub-network that may misdirect those data flows by correcting routing errors that incorrectly route a data flow to the wrong load balancer device as a result of those changes. As such, the multiple persistent load balancer system of the present disclosure is highly scalable and does not incur the overhead associated with conventional systems that synchronize the state/user session information between all of the persistent load balancer devices in the system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multiple persistent load balancer system, comprising:
   a routing sub-network including a plurality of routing sub-network nodes;
   a first persistent load balancer device coupled to the plurality of routing sub-network nodes;
   a second persistent load balancer device coupled to the plurality of routing sub-network nodes; and
   a controller coupled to each of the plurality of routing sub-network nodes and the first persistent load balancer device, wherein the controller is configured to provide a common routing algorithm and a destination distribution list to each of the plurality of routing sub-network nodes and the first persistent load balancer device;
   wherein the first persistent load balancer device is configured to receive a first data flow from at least one of the plurality of routing sub-network nodes, determine the first persistent load balancer device does not include state information for the first data flow and, in response, use the common routing algorithm and the destination distribution list to determine that the first data flow should be redirected to the second persistent load balancer device, and forward the first data flow through at least one of the plurality of routing sub-network nodes to the second persistent load balancer device.

2. The multiple persistent load balancer system of claim 1, wherein destination distribution list associates the first persistent load balancer device and the second persistent load balancer device with a common address.

3. The multiple persistent load balancer system of claim 1, wherein the first persistent load balancer device is configured to use the common routing algorithm and the destination distribution list to determine that the first data flow should be redirected to the second persistent load balancer device by:

performing a hashing operation on the first data flow using the common routing algorithm to produce a hashing result; and determining that the hashing result is associated with the second persistent load balancer device in the destination distribution list.

4. The multiple persistent load balancer system of claim 1, wherein the first persistent load balancer device is configured to receive a second data flow from at least one of the plurality of routing sub-network nodes, use the common routing algorithm and the destination distribution list to determine that the second data flow should be processed by the first persistent load balancer device and, in response, process the second data flow to retrieve at least one resource from at least one server device.

5. The multiple persistent load balancer system of claim 1, wherein the first persistent load balancer device is configured to receive a second packet for the first data flow from at least one of the plurality of routing sub-network nodes subsequent to receiving a first packet for the first data flow that was forwarded to the second persistent load balancer device, use the common routing algorithm and the destination distribution list to determine that the second packet for the first data flow should be redirected to the second persistent load balancer device and, in response, take control of the first data flow from the second persistent load balancer device.

6. An information handling system (IHS), comprising:
a communication system;
a processing system that is coupled to the communication system; and
a memory system that is coupled to the processing system and that include instruction that, when executed by the processing system, cause the processing system to provide a data flow processing engine that is configured to:
  receive a routing algorithm and a destination distribution list from a controller;
  receive a first data flow through the communication system in response to at least one routing sub-network node processing the first data flow using the routing algorithm;
  use the routing algorithm and the destination distribution list to determine that the first data flow should be processed;
  process the first data flow to retrieve at least one resource from at least one server device;
  receive a second data flow through the communication system in response to at least one routing sub-network node processing the second data flow using the routing algorithm;
  determine the memory system does not include state information for the first data flow and, in response, use the routing algorithm and the destination distribution list to determine that the second data flow should be redirected to a persistent load balancer device; and
  forward the second data flow through the communicating system to the persistent load balancer device.

7. The IHS of claim 6, wherein destination distribution list associates the IHS and the persistent load balancer device with a common address.

8. The IHS of claim 6, wherein the using the routing algorithm and the destination distribution list to determine that the second data flow should be redirected to the persistent load balancer device includes:

performing a hashing operation on the second data flow using the routing algorithm to produce a hashing result; and determining that the hashing result is associated with the persistent load balancer device in the destination distribution list.

9. The IHS of claim 6, wherein the data flow processing engine is configured to:
receive a second packet for the second data flow through the communication system in response to at least one routing sub-network node processing the second data flow using the routing algorithm, wherein the second packet is received subsequent to receiving a first packet for the second data flow that was forwarded to the persistent load balancer device; and
use the routing algorithm and the destination distribution list to determine that the second packet for the second data flow should be redirected to the persistent load balancer device and, in response, take control of the second data flow from the persistent load balancer device.

10. The IHS of claim 9, wherein the taking control of the second data flow from the persistent load balancer device includes:
retrieving a current status of the second data flow from the persistent load balancer device;
receiving a third packet for the second data flow through the communication system in response to at least one routing sub-network node processing the third packet using the routing algorithm, wherein the third packet is received subsequent to receiving the second packet; and
processing the third packet for the second data flow to retrieve at least one resource from at least one server device.

11. The IHS of claim 9, wherein the taking control of the second data flow from the persistent load balancer device includes:
informing the at least one routing sub-network node and the persistent load balancer device that control of the second data flow has been taken.

12. A method for providing multiple persistent load balancers, comprising:
receiving, by a first persistent load balancer device from a controller, a routing algorithm and a destination distribution list;
receiving, by the first persistent load balancer device from at least one routing sub-network node, a first data flow in response to the at least one routing sub-network node processing the first data flow using the routing algorithm;
determining, by the first persistent load balancer device, the first persistent load balancer device does not include state information for the first data flow and, in response, using, by the first persistent load balancer device, the routing algorithm and the destination distribution list to determine that the first data flow should be redirected to a second persistent load balancer device; and
forwarding the first data flow to the second persistent load balancer device.

13. The method of claim 12, wherein destination distribution list associates the first persistent load balancer device and the second persistent load balancer device with a common address.

14. The method of claim 12, wherein the using the routing algorithm and the destination distribution list to determine that the first data flow should be redirected to the second persistent load balancer device includes:
- performing, by the first persistent load balancer device, a hashing operation on the first data flow using the routing algorithm to produce a hashing result; and
- determining, by the first persistent load balancer device, that the hashing result is associated with the second persistent load balancer device in the destination distribution list.

15. The method of claim 12, further comprising:
- receiving, by the first persistent load balancer device from the at least one routing sub-network node, a second data flow in response to the at least one routing sub-network node processing the second data flow using the routing algorithm; and
- using, by the first persistent load balancer device, the routing algorithm and the destination distribution list to determine that the second data flow should be processed by the first persistent load balancer device and, in response, processing the second data flow to retrieve at least one resource from at least one server device.

16. The method of claim 12, further comprising:
- receiving, by the first persistent load balancer device from the at least one routing sub-network node, a second packet for the first data flow in response to at least one routing sub-network node processing the first data flow using the routing algorithm, wherein the second packet is received subsequent to receiving a first packet for the first data flow that was forwarded to the second persistent load balancer device; and
- using, by the first persistent load balancer device, the routing algorithm and the destination distribution list to determine that the second packet for the first data flow should be redirected to the second persistent load balancer device and, in response, taking control of the first data flow from the second persistent load balancer device.

17. The method of claim 16, wherein the taking control of the first data flow from the second persistent load balancer device includes:
- retrieving, by the first persistent load balancer device from the second persistent load balancer device, a current status of the first data flow;
- receiving, by the first persistent load balancer device from the at least one routing sub-network node, a third packet for the first data flow subsequent to receiving the second packet for the first data flow; and
- processing, by the first persistent load balancer device, the third packet for the first data flow to retrieve at least one resource from at least one server device.

* * * * *